United States Patent [19]

Akram et al.

[11] Patent Number: 4,530,093
[45] Date of Patent: Jul. 16, 1985

[54] PCM TELECOMMUNICATIONS SYSTEM FOR VOICE AND DATA

[75] Inventors: Tahir Akram; Daniel S. Bartozzi, both of Guelph; Paul P. Dasiewicz, Kitchner, all of Canada

[73] Assignee: International Standard Electric Corporation, New York, N.Y.

[21] Appl. No.: 510,857

[22] Filed: Jul. 5, 1983

[51] Int. Cl.³ .......................... H04Q 11/04; H04J 3/02
[52] U.S. Cl. ......................................... 370/85; 370/58
[58] Field of Search ...................... 370/85, 95, 58, 96

[56] References Cited

U.S. PATENT DOCUMENTS

| 4,155,115 | 5/1979 | Wilske | 370/85 |
| 4,271,505 | 6/1981 | Menot et al. | 370/95 |
| 4,371,925 | 2/1983 | Carberry et al. | 370/85 |
| 4,380,065 | 4/1983 | Hirtle et al. | |

OTHER PUBLICATIONS

J. Kasson et al., "Skinny-Wire Key Telephones and the ROLM®CBX", NTC 1976, Nov.-Dec. 1976, pp. 11.4-1-11.4-4.

Primary Examiner—Douglas W. Olms
Assistant Examiner—Wellington Chin
Attorney, Agent, or Firm—John T. O'Halloran; Thomas F. Meagher

[57] ABSTRACT

A stored program telecommunications system of the hybrid PBX/ey system type. The system uses two level distributed processor architecture for control and switching and pulse code modulation (PCM) for speech transmission. The system controller directs operation of the second level or group controllers, there being one group controller for each group of ports. Ports may be station instruments of either the single line or multiple line type, trunk lines or data terminals. Data from the data terminals is generally slower than the repetition rate of PCM data, therefore system time slots capable of PCM transmission may be allotted to handle more than one data terminal through sub-multiplexing of time slots. The sub-multiplexing of PCM time slots is controlled by the system controller acting through the controller for the group initiating the call with a data interface circuit providing access between a data terminal and a group level speech bus. One data interface circuit may control up to four data terminals.

8 Claims, 17 Drawing Figures

PCM TELECOMMUNICATIONS SYSTEM FOR VOICE AND DATA

BACKGROUND OF THE INVENTION

This invention comprises an improvement in the two level system shown by U.S. Pat. No. 4,339,633 issued July 13, 1982 and U.S. Pat. No. 4,379,950 issued Apr. 12, 1983 both to F. Ahmed. In a system of the type shown by the patents called a digital hybrid PBX/key system, each station instrument of the multiple line type has four conductors accessing the system, two control conductors and two speech conductors. Two wire telephone instruments may also be used, the two wires being the speech or voice leads. The speech conductors have access to a common pulse code modulation system (PCM) bus for the transfer of speech and certain control data between the plural, multi-port groups of the system and the system controller. The system bus commonly serves a plurality of groups of ports, each port being either a station, trunk or attendants cabinet. Idle time slots on the PCM bus are assigned by the system controller for use by a port in completing a call, with two time slots on the bus being assigned for each call.

Once a pair of time slots has been assigned to a call, the speech data in digital form is transmitted over the PCM bus between time slot interchangers (TSI), one such interchanger for each port involved in the call.

At the system level there is provided a system controller comprised of a processor which may either be the 8086 or 8088 microprocessor with associated memory. Each group of the system is equipped with microprocessor preferably of the 8086 type along with its associated memory.

Call processing is handled by a port accessing its group control over its control conductors. Request is made for the allocation of a pair of time slots on the PCM bus for the implementation of the call from the port. Available time slots are assigned and calling information is generated at the port and transmitted using the allocated time slots. The system controller processes calling information over the voice conductors and completes the call to a called station which may be a station connected to another port of the system, or may be a station outside the system using a trunk port to exit the system, the call being completed over the two allocated time slots for speech transmission over the speech conductors in PCM format. Call supervision is generally accomplished over the *voice* conductors.

SUMMARY OF THE INVENTION

The present invention is directed to an enhancement of the reference system to enable the connection of data terminals at ports of the system. Any of the station ports may be converted to data terminal ports by the substitution of a data interface circuit for the station circuit. A data interface which may serve up to four data terminals couples a data terminal to both the group voice bus and the group control bus.

Since the repetition rate of data from a data terminal is slower than that generally required for speech using PCM signalling, one speech time slot on the system bus may be allocated to handle data from a plurality of data terminals. Up to eight data terminals may be handled by one time slot, dependent on the repetition rate of the data being sent.

In the system, time slots are assigned to handle calls-speech or data,-by the system controller on a demand basis. The system memory keeps track of the time slot assignments. When a time slot for a data call is indicated, the system controller checks its memory to see if any time slots are handling data calls and if so whether any sub-time slots on the slot or slots passing data are available for use. If such subtime slots are available, they are assigned to handle the data call seeking service. If not, a pair of time slots are allocated for data use and two or more sub-slots of the assigned slot are assigned to the data call.

Data devices or terminals may be inserted in any group of the system. However, since a data interface within a group is capable of handling up to four data terminals, data terminals should preferably be clustered with four or less terminals per cluster.

Each such data terminal is connected to the system by four conductors, two control data leads and two data leads. The leads from the terminal enter the interface at a RS232/RS422 interface. Within the interface, data is stored and converted to serial PCM signals for transmission through the system over the system bus over a designated time slot and sub-time slot.

It is therefore an object of the invention to provide a digital PBX system capable of receiving and transmitting digital data to and from digital terminal devices.

It is a further object of the invention to provide a digital PBX having two level architecture which is capable of handling speech initiated digital data and/or digitally initiated data interchangeably within the system.

DETAILED DESCRIPTION

Figure 1:
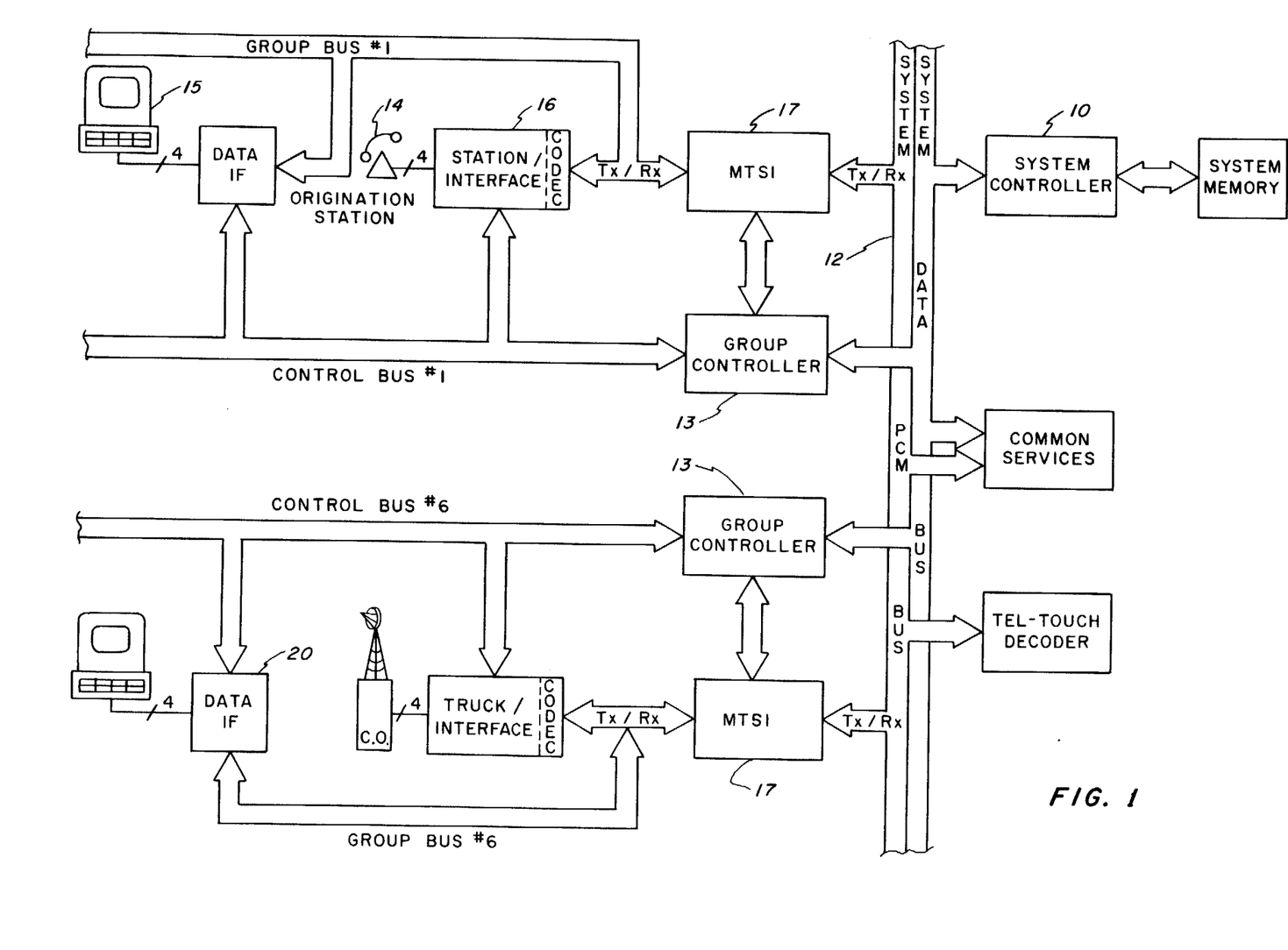
FIG. 1 is a schematic block diagram of the system to which the present invention is applied.

FIG. 1 shows a simplified block diagram of a digital PBX system of the type shown by the cited Ahmed patents. The system uses a two level control hierarchy with a system controller 10 controlling a system PCM bus 12 and group controllers 13 1 and 6 controlling respective groups of ports over respective group PCM busses. Each group may have up to twenty-four ports. The ports may be normal telephone stations 14 having voice transmission capability, trunk lines to other exchanges, and/or data terminals 15 of any conventional type. Each type of port has an interface (IF) of its own type within the type for handling up to four stations or terminals. The interface 16 for stations contains a codec for converting analog voice signals to digital PCM for transmission over the group bus to the system bus through the modular time slot interchanger 17 for the group and for the reverse conversion to the station port.

The instrument or terminal at each port preferably has four conductors coupling it to its respective interface, two control conductors and two data conductors. For ports used for station telephone lines, an instrument of the type shown by U.S. Pat. No. 4,315,110 to J. M. Davis dated Feb. 9, 1982 may be used. The control conductors (called data pair in the cited reference) respond to hookswitch operation and depression of one or another line buttons to notify the group and system of the particular button operation. Single line telephone instruments having only a single pair of leads may be provided at the ports of the system, if desired.

Figure 2:
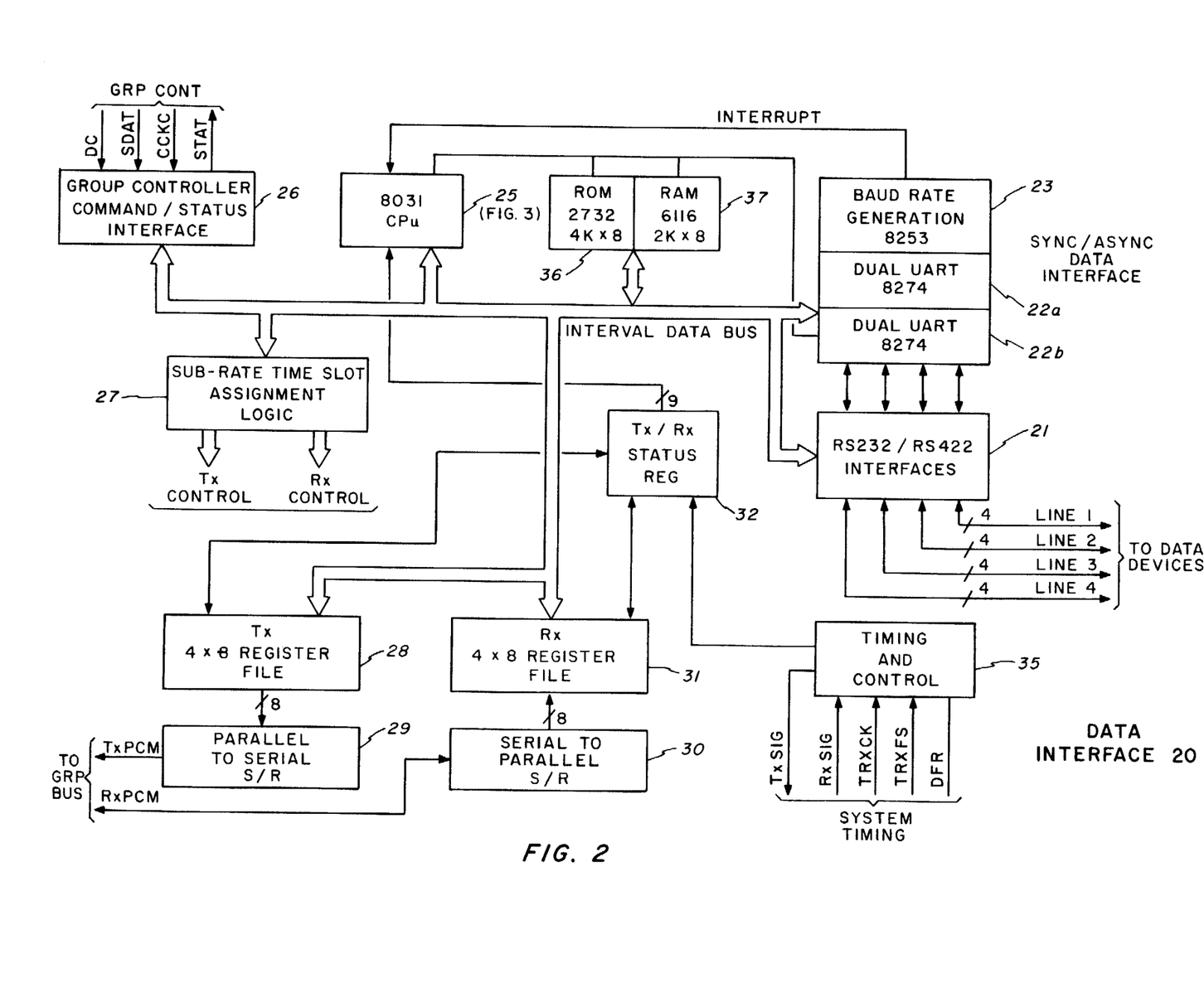
FIG. 2 is a schematic block diagram of the data interface circuit of FIG. 1.
Figure 3:
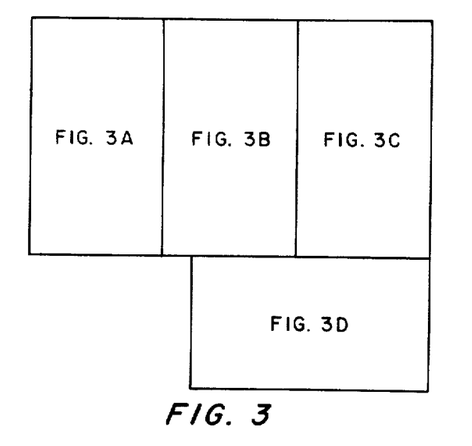
FIGS. 3-5 combined are block diagrams showing the spatial relationship of FIGS. 3A-D, FIGS. 4A-D and FIGS. 5A-C to complete the interface unit of FIG. 2.
Figure 3A:
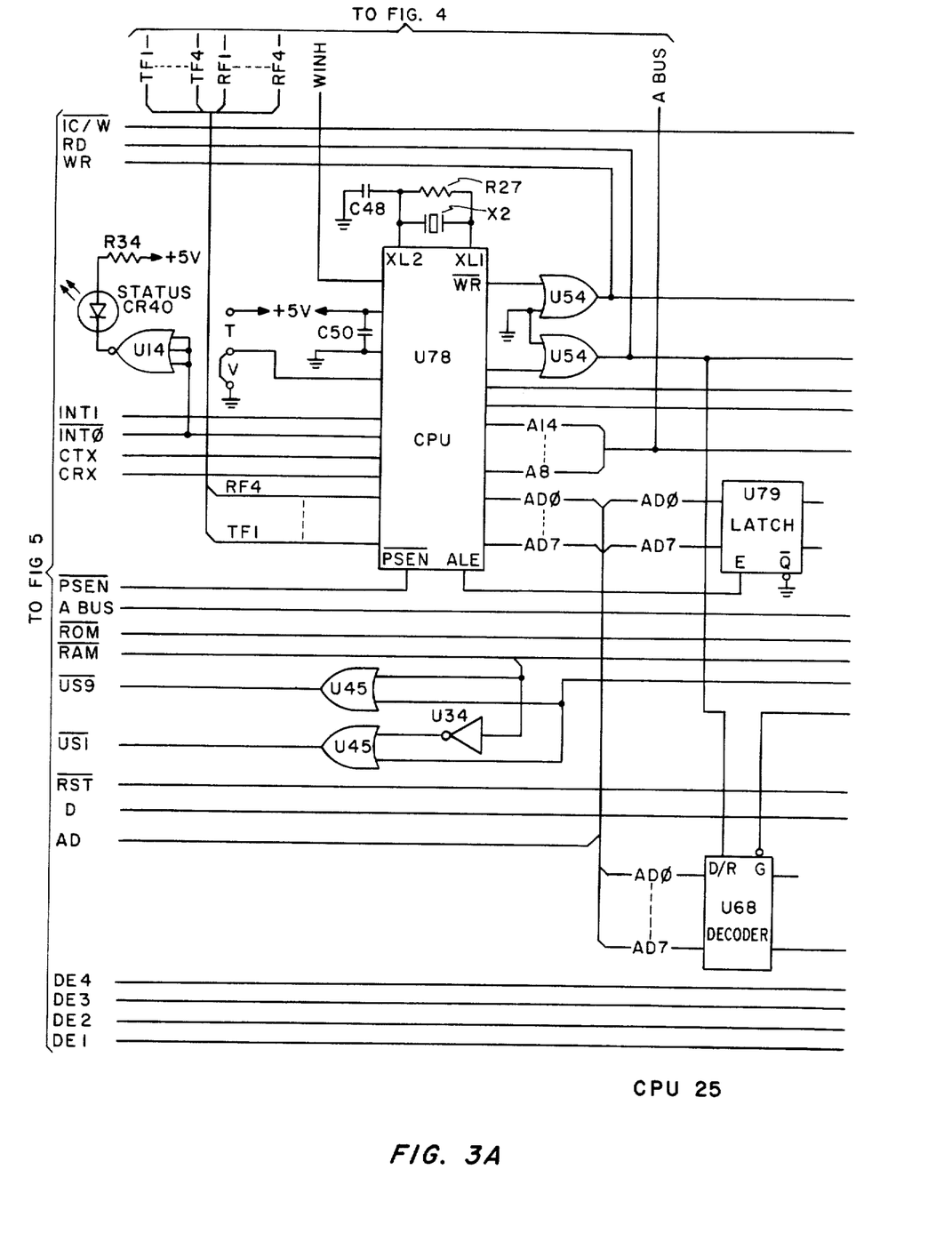
Figure 3B:
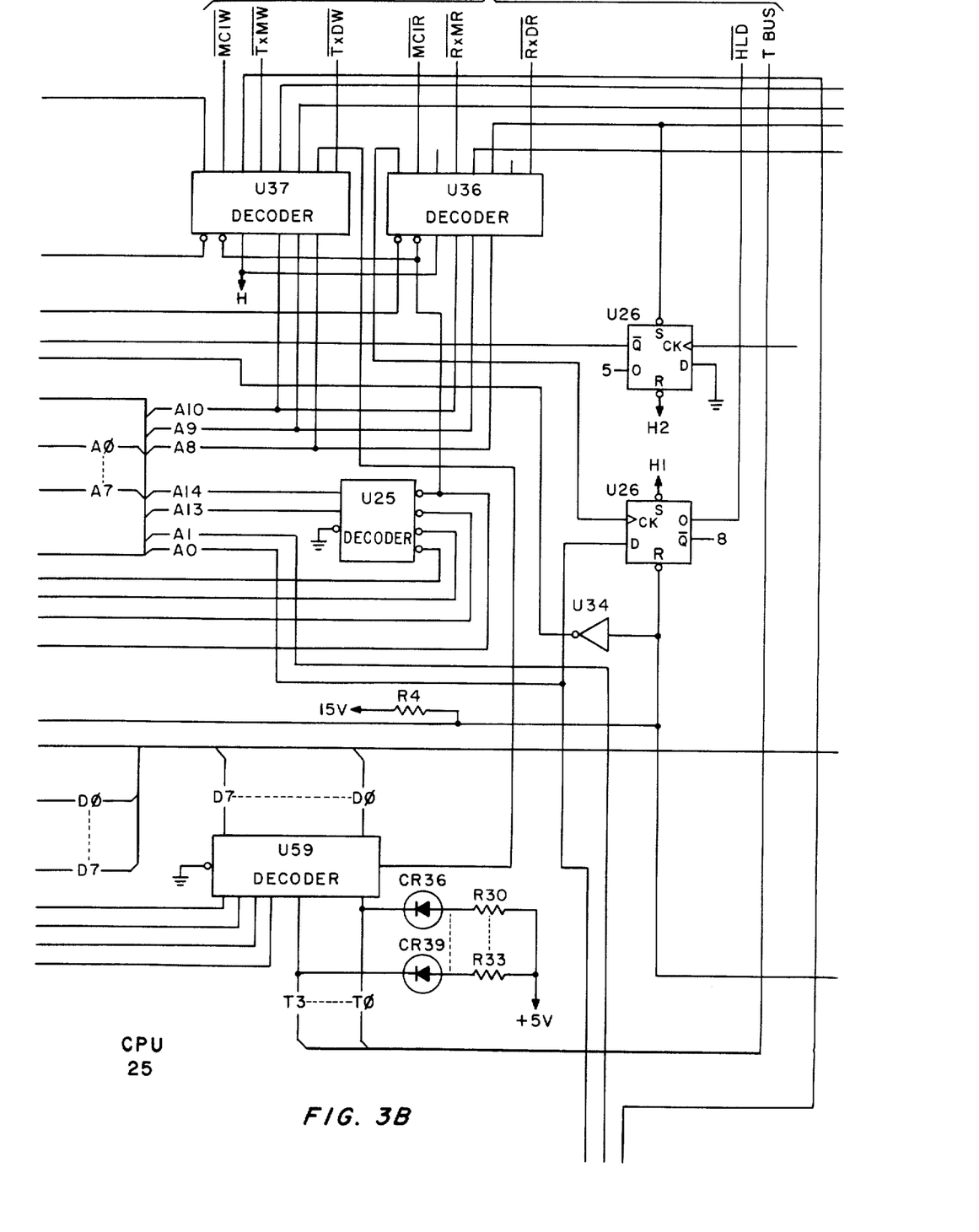
Figure 3C:
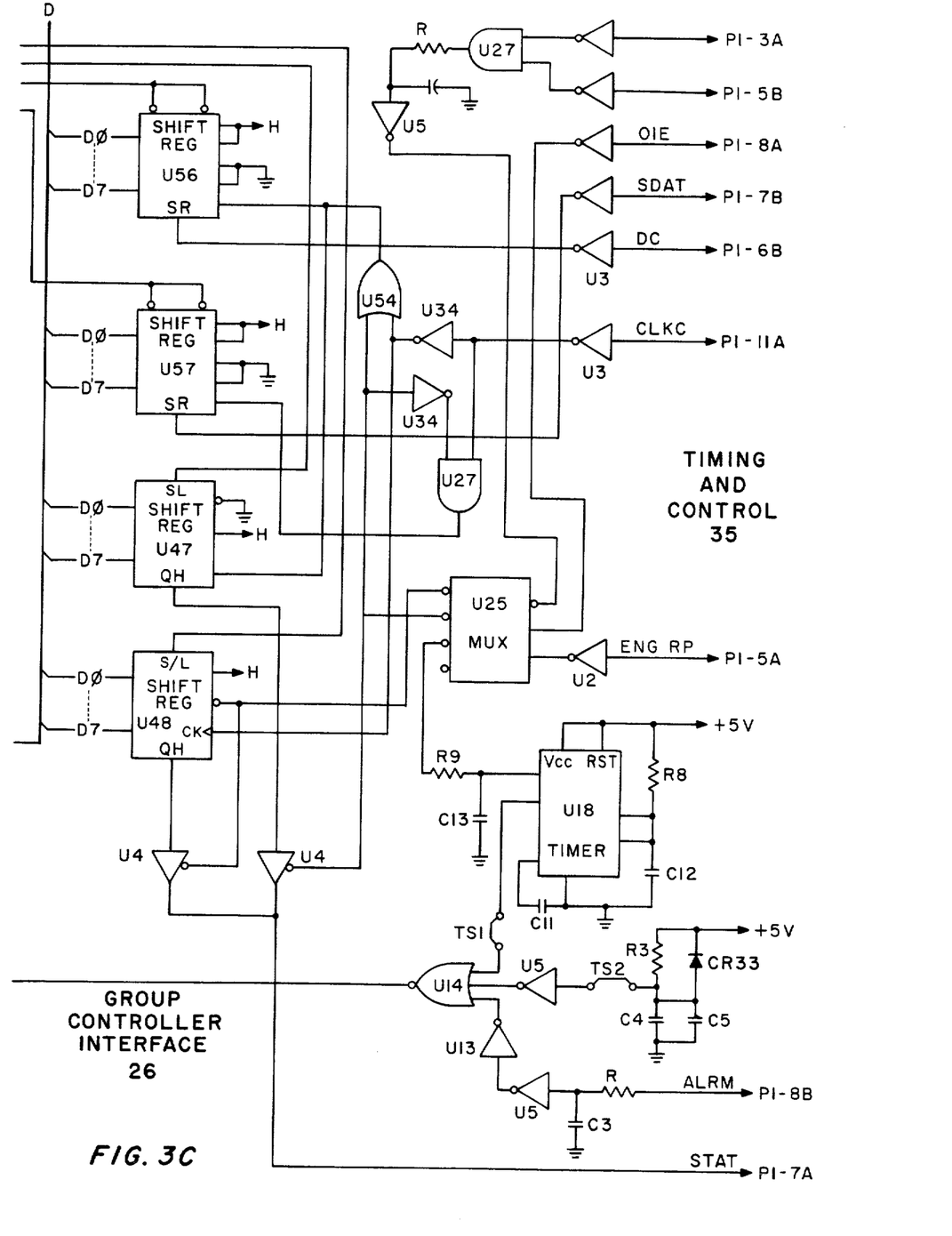
Figure 3D:
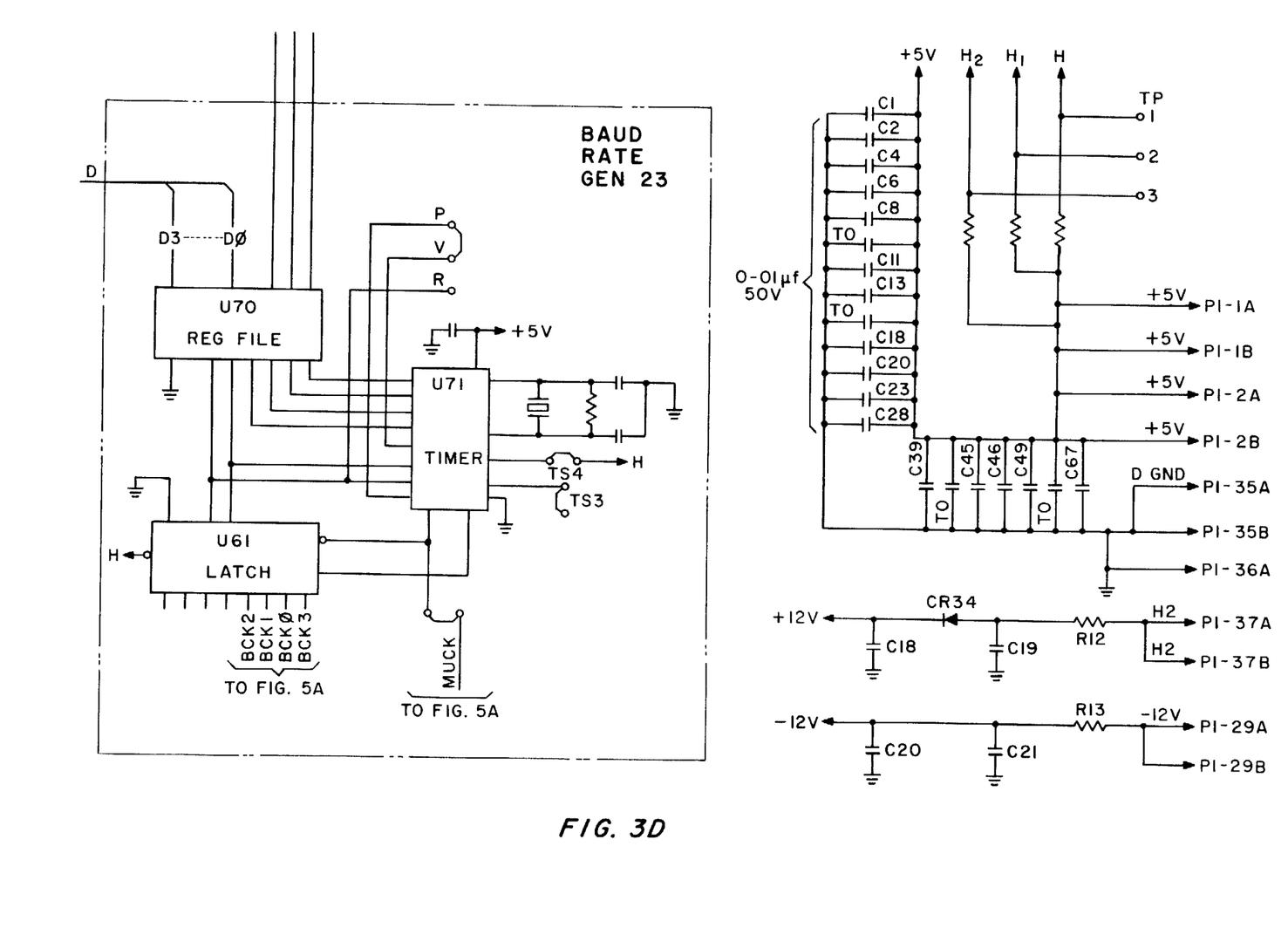

The data interface unit 20, shown in block form in FIGS. 2 and 3 monitors up to four ports with each port containing a data terminal. The line to a port, as mentioned, contains four conductors, two control conductors and two data conductors. The port conductors are coupled to the interface at an RS232/RS422 sync/async serial data interface 21. The RS232 C interface is limited to interconnection lengths of less than 50 feet for unbalanced lines with the RS422 interface for balanced lines and interconnection lengths of up to 2000 feet, as is well-known. From the interface 21, the data or control information is transmitted to a universal asynchronous receiver/transmitter 22 commonly known as UART for conversion to a format usable in the data interface unit. Control information is sent to the interface unit CPU 25 which continuously monitors the UART. This CPU may be of the 8031 type.

Control information is sent to the group controller 13 (FIG. 1) over the group controller interface 26. From the group controller, information is sent to the system controller. Within the system controller, when a data terminal seeking a channel or channel recurrence position called a sub-time slot, the terminal class of service is checked. If the class of service allows the requested service, a time slot and recurrence position are assigned by the system control. The address of that time slot and recurrence position is sent to the group controller and the sub-rate time slot assignment logic (TSAL) 27 (FIG. 3) for control of the transmit and receive time slots.

Data itself is received from a terminal through the RS232/RS422 interfaces 21, the UARTS 22 and the data bus to the CPU 25. From the CPU, the data is transmitted to the transmit register file 28 and the parallel to serial shift register 29 to the PCM line over the Tx PCM lead within the time slot and recurrence period specified by the TSAL 27.

Incoming data is received from the PCM system bus on the Rx PCM lead to the serial to parallel shift register 30 and transferred to the Rx register file 31. Data is separated from control information in this file and forwarded to the data terminal over the UART 22 of interface 21. The last control signal is also stored in register 31.

The transmit/receive status register (Tx/Rx status) 32 stores indications of the status of each Rx and Tx register files (28, 31).

In the event of an inactive condition at a data terminal, the last control data generated by the CPU 25 is continuously transmitted to the terminal as an indication of the null or inactive condition.

Also shown in FIG. 3 are the timing and control circuit 35 which receive timing signals from the system control for initial use by the Tx/Rx status register 32. Also shown are the ROM 36 and RAM 37 which form the program memory for the CPU 25.

Within the UART stage 22, there are two dual UARTS 22a and 22b each capable of interfacing with two data terminals for the interchange of signals, these UARTS may be of the type sold as model 8274 or 2681. Data from the interfaces is transmitted to/from the CPU at the rate generated by the baud rate generator 23.

Figure 4:
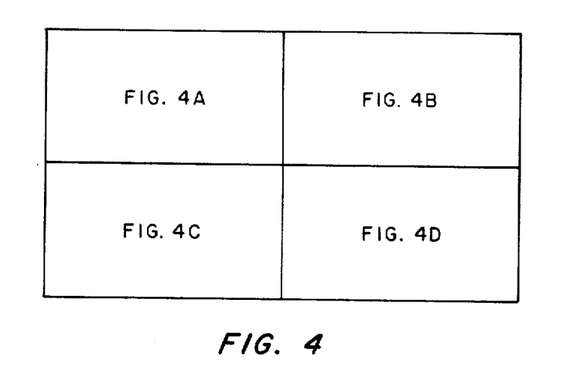
Figures 5, 5A:
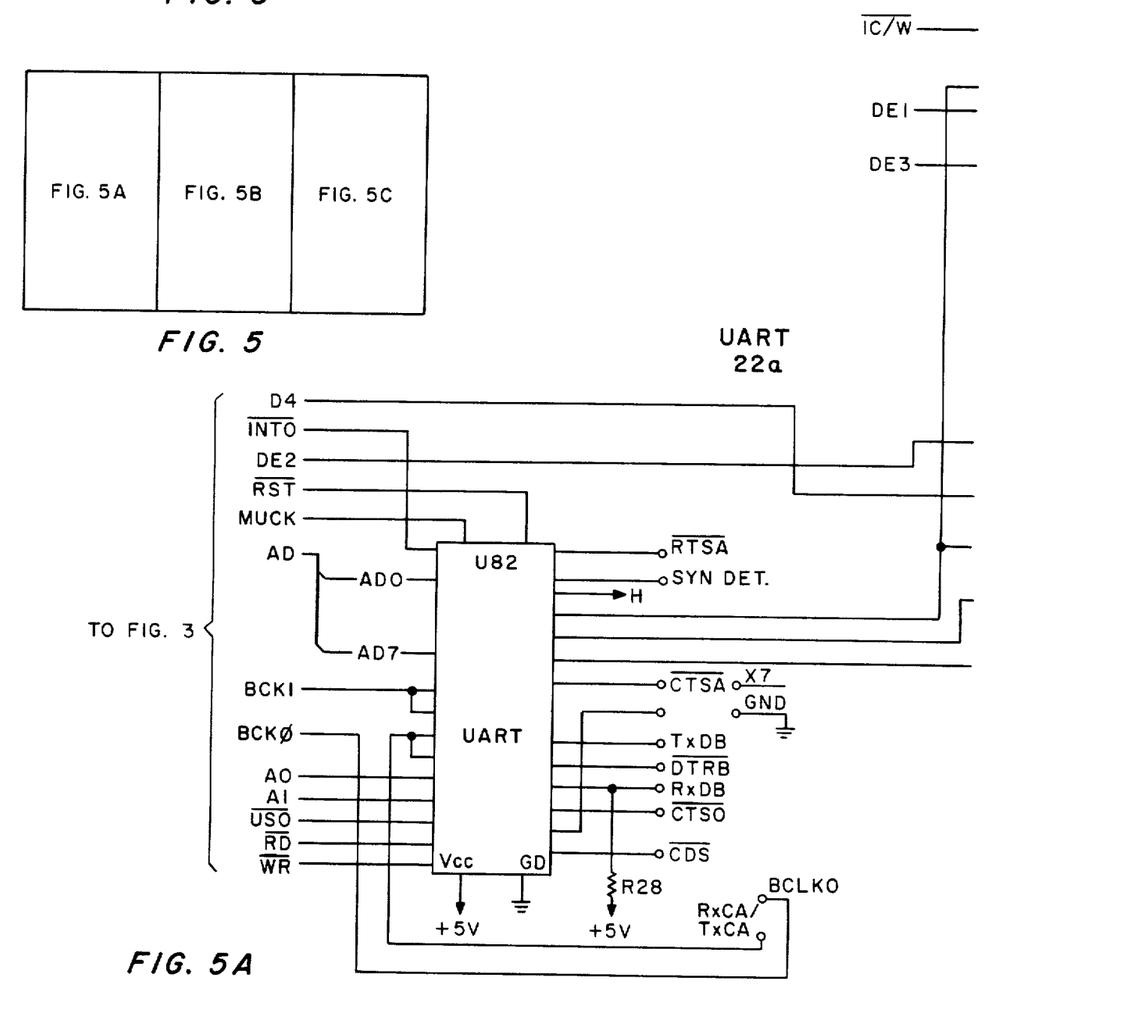

In FIGS. 3-5, we show the interface unit 20 in greater detail with the components circuits outlined to agree with the showing of FIG. 2. Shown collectively as the internal data bus in FIG. 2, are a plurality of busses. Within the circuit of FIGS. 3-5, designated T (timing), D (data), AD (data/address), A (address), and F busses.

Figure 5B:
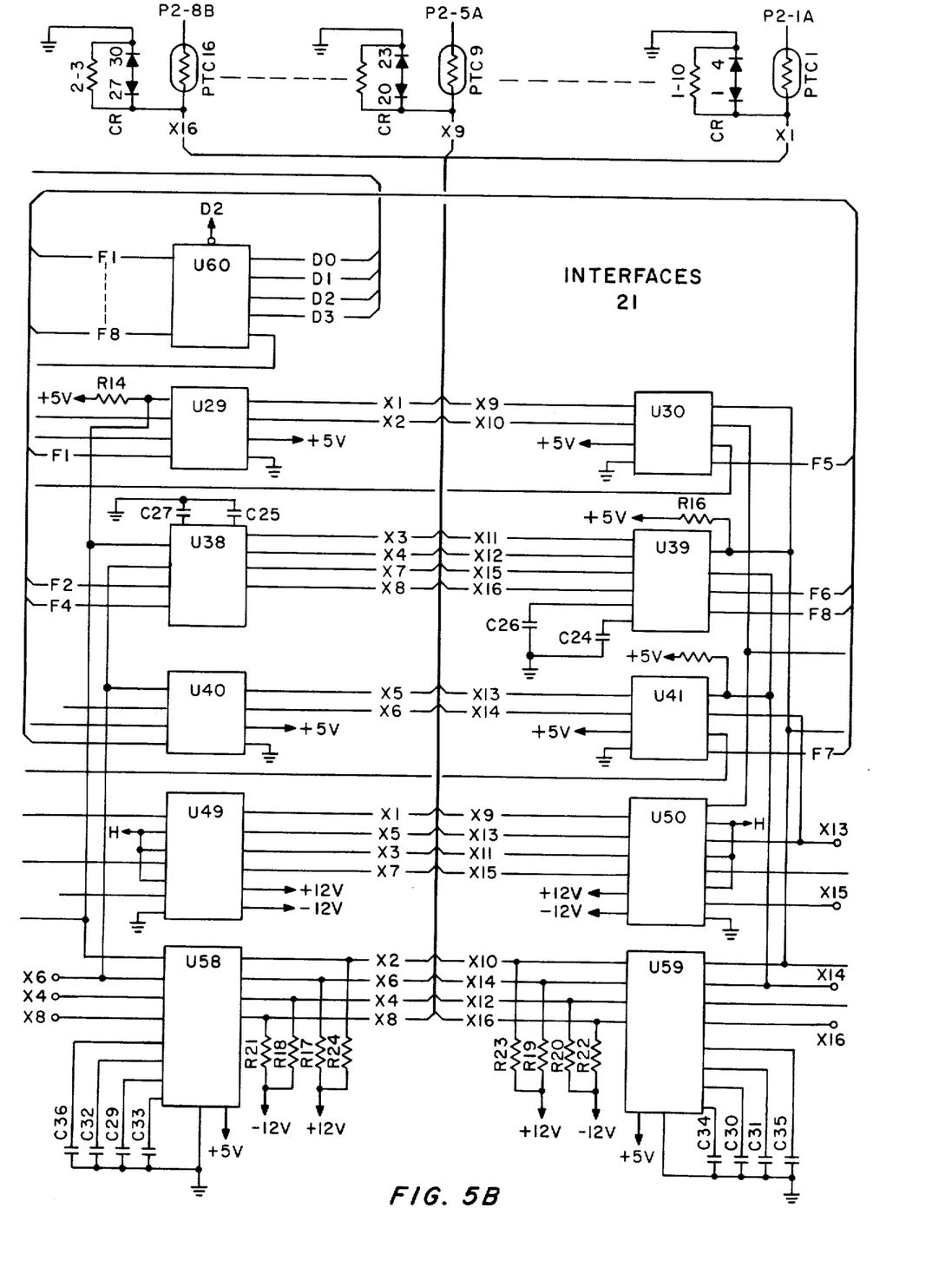
Figure 5C:
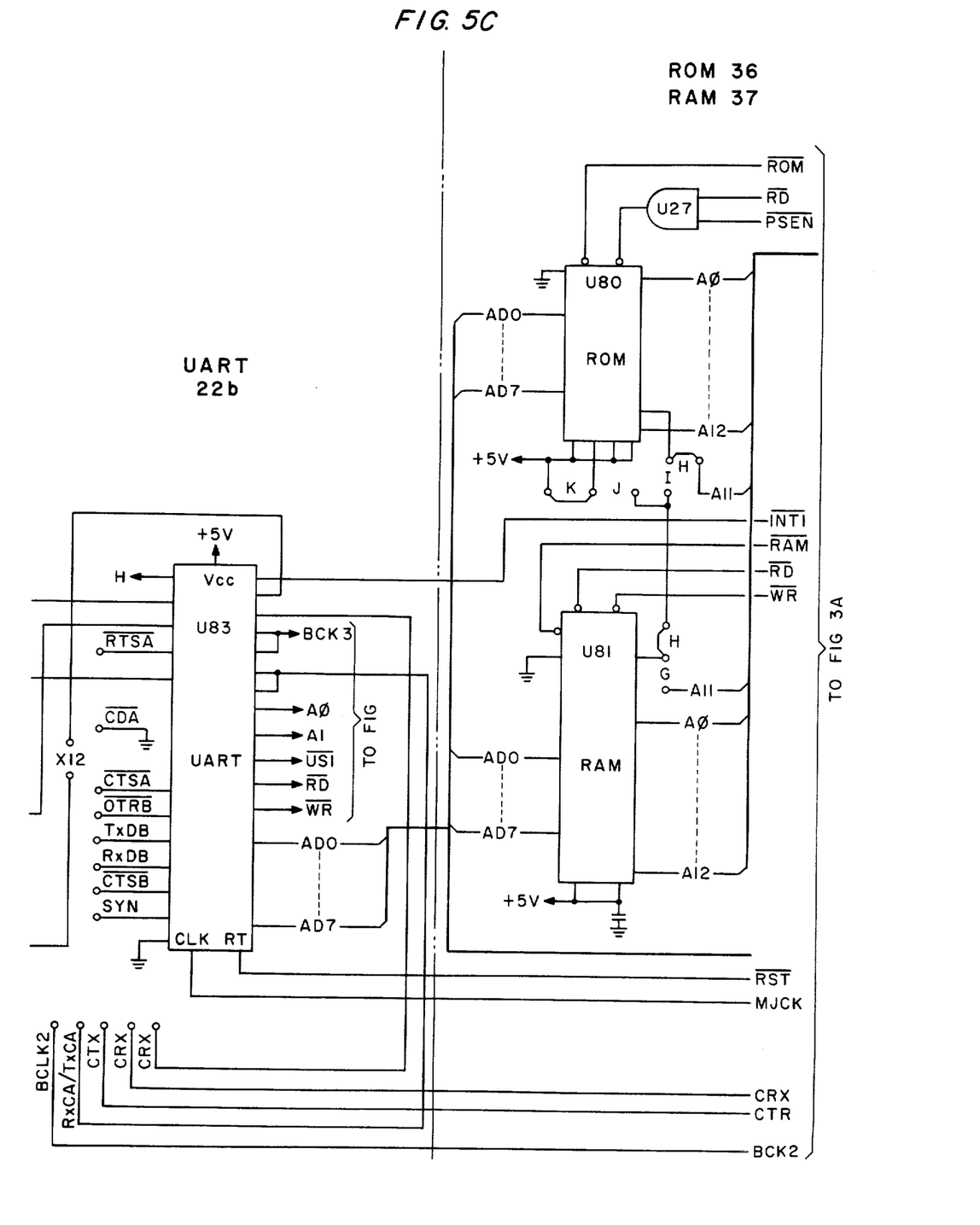

In FIG. 5B, is shown the RS232/RS422 line interface 21 feeding the data bus D to provide data to the line drivers and flip flops.

If either data appears on the data leads P1-1A to P1-29B from a terminal or if a transition occurs on the data control leads, the transition or condition is noted by the line interface drivers and receivers U29, U30, U38, U39, U40, U41 signaled to the UART's. The signals are converted to TTL format for the UART U82 (22a) and U83 (22b) and transmitted to the CPU 25 comprised of U78, latch U79 and decoders 36, U37, U59 and U68 for transmission to the group controller and to the system control.

Figure 4A:
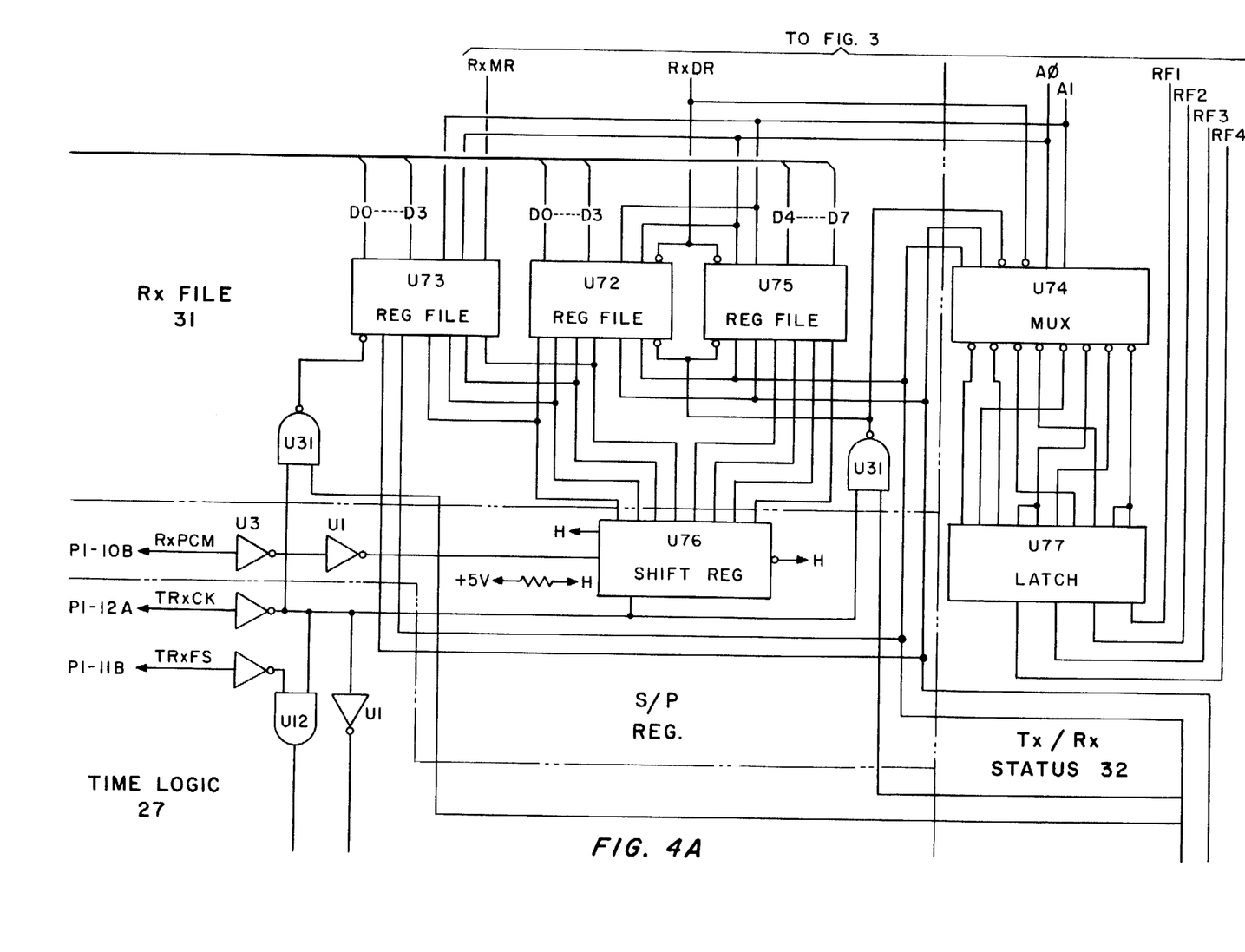
Figure 4B:
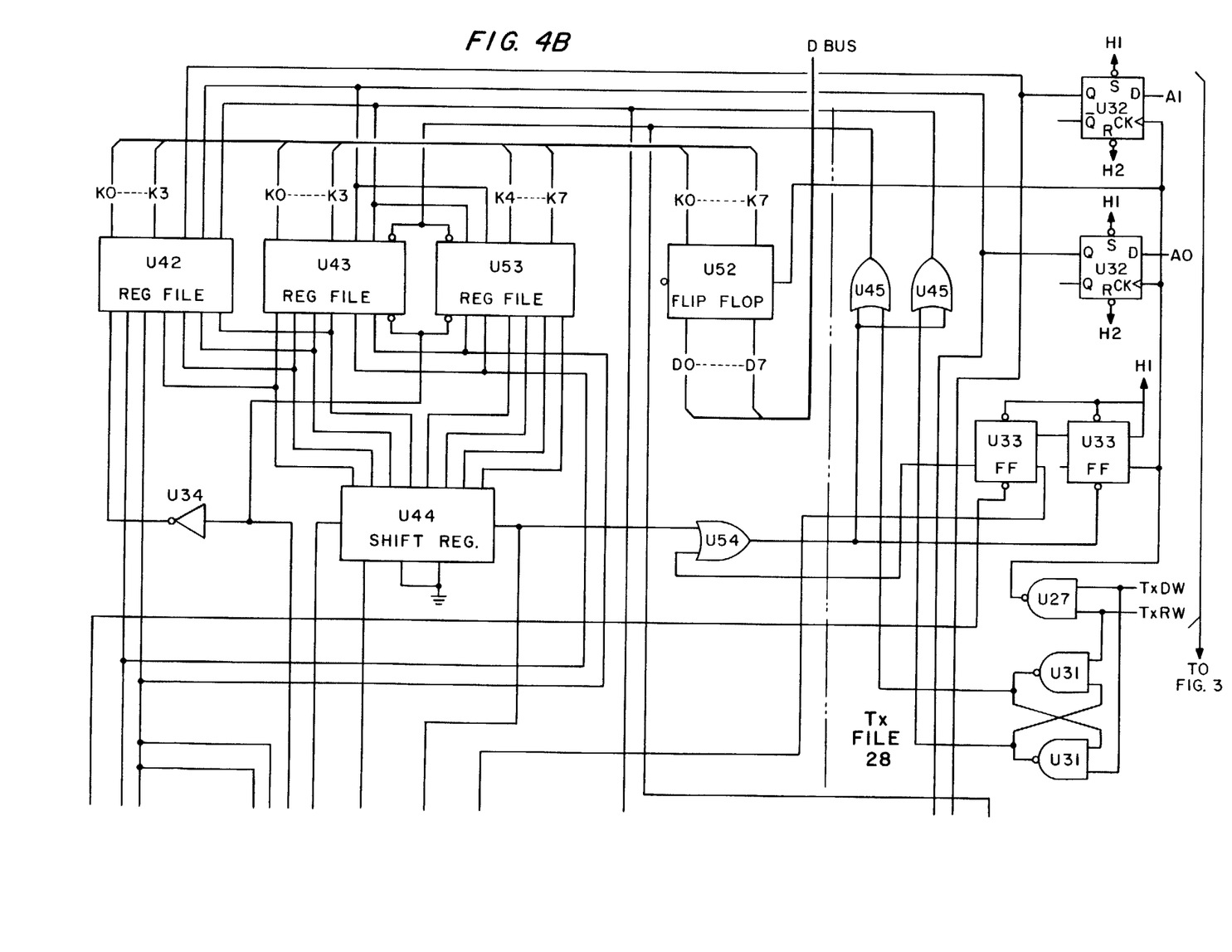
Figure 4C:
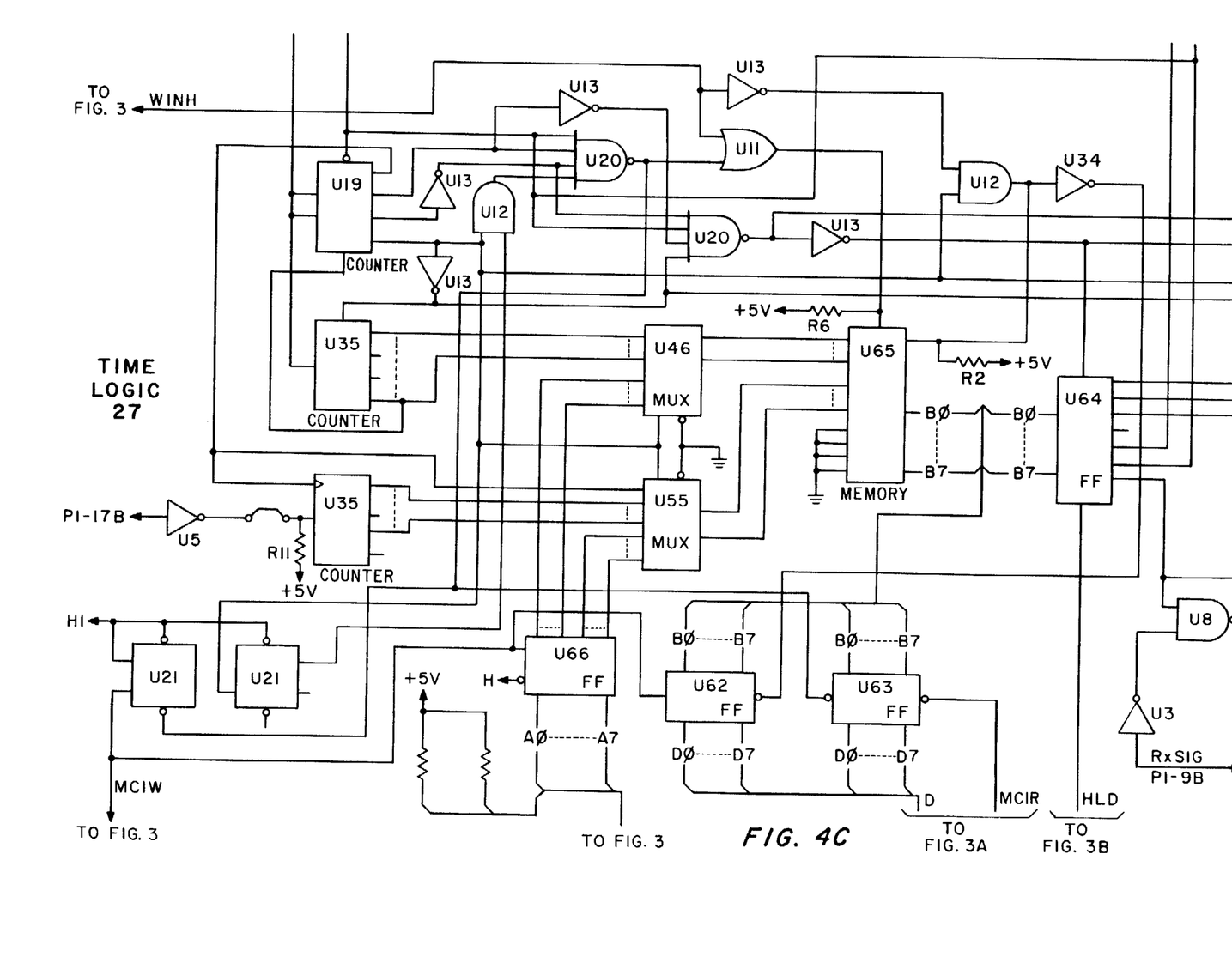
Figure 4D:
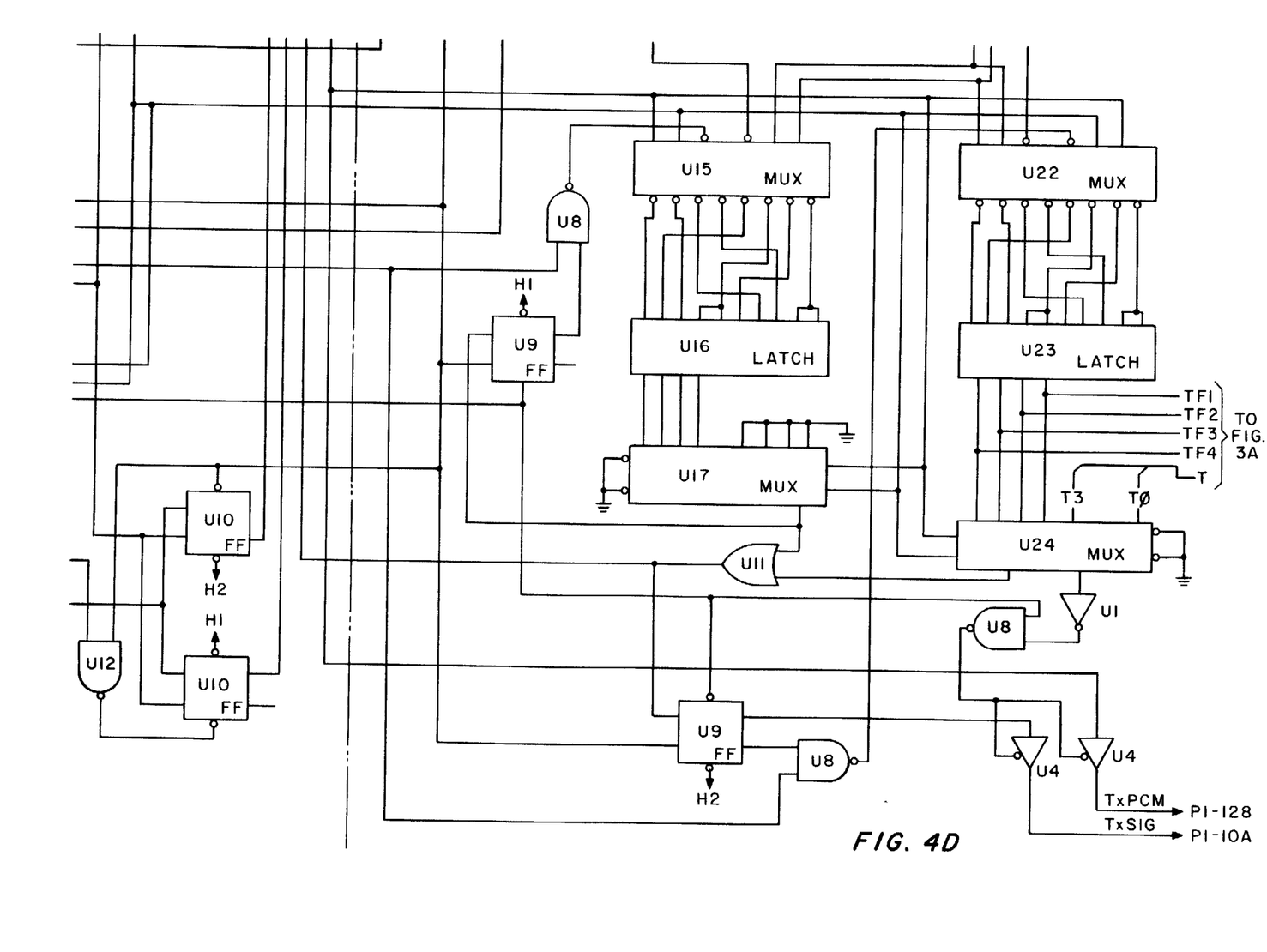

The system control assigns a channel and recurrence position (See FIG. 6) and programs the group MTSI 17 for data at the channel and sub-rate position. The channel and sub-rate information is also sent to the time assignment logic TSAL 27 (FIG. 4C) comprised of counters U19 and U35, flip flops U62, U63, U64 and U66, multiplexers U46 and U55 and gates and the 256×8 RAM U65.

Figure 6:
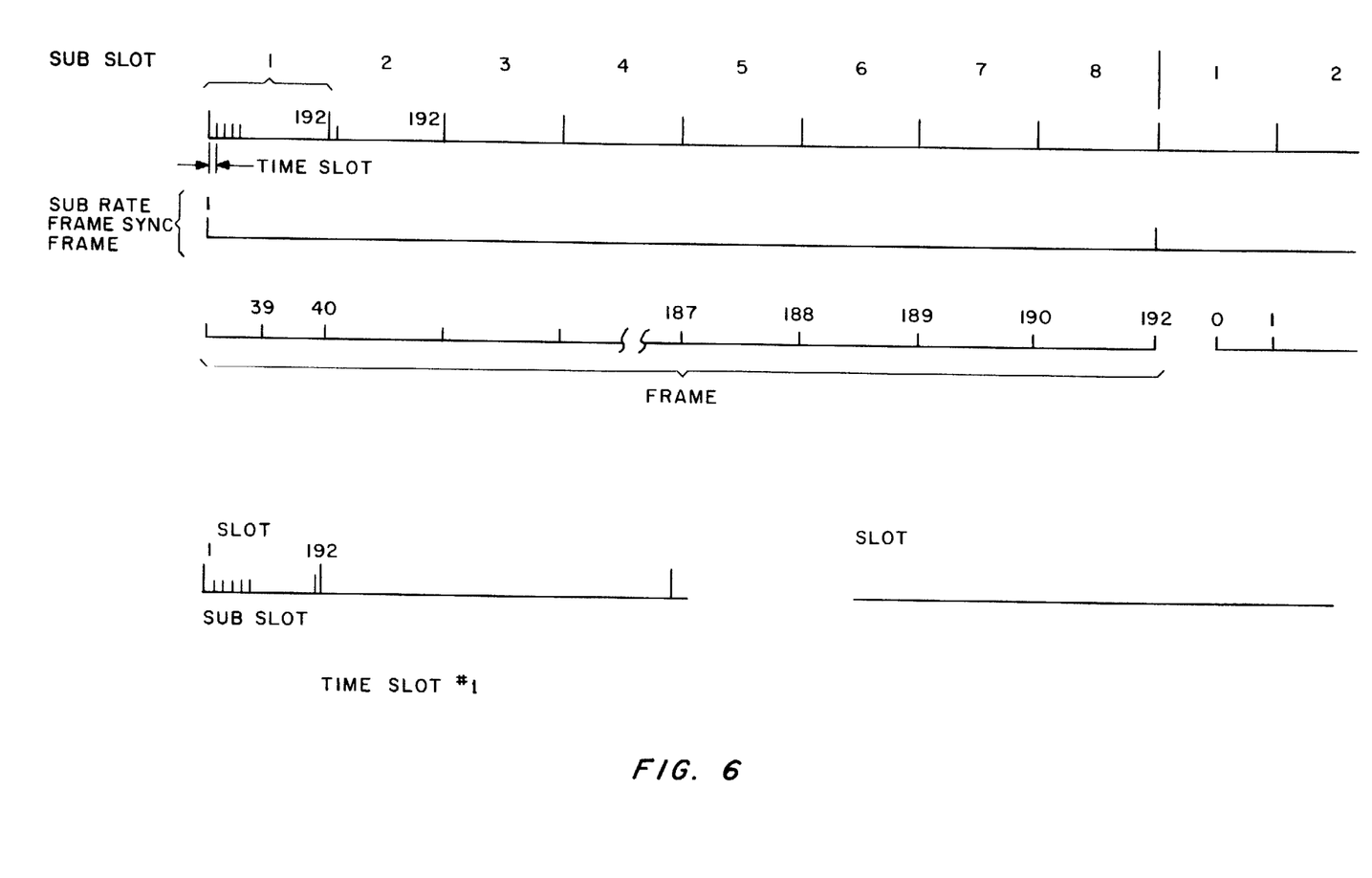
FIG. 6 is a data chart for the invention.

The system control assigns a system time slot (0-191), shelf group slot (0-23) and sub-rate (0-7) recurrence position (see FIG. 6). The system transmits this information to the group control which programs the MTSI with the system time slot and shelf slot. The group control transmits the shelf slot and sub-rate slot to the data interface unit 12 for programming n+e time assignment logic TSAL (FIG. 4c) comprised of counters U19 and U35, flip flops U62, U63, U64 and U66, multiplexers U46 and U55 and the 256×8 RAM U65. The TSAL is controlled by the frame synchronized lead TRXFS to the counters U19 and U35 of the TSAL.

Both incoming and outgoing data in the interface is buffered within the RAM 37 (U81) over the A and AD leads for conversion between terminal data speed and PCM rate or subrate speeds. The ROM 36 (U80) associated with the RAM provides a control program for the CPU.

Before the CPU causes the output of any data, a check is made to see whether the Tx Reg 28 (FIG. 4B) or Rx Reg 31 (FIG. 4A) (whichever is indicated) are ready for use. The Tx and Rx status Register 32 monitors the readiness of the Tx Register File 28 and Rx Reg. file 31 to control the transfer of data to or from the respective register.

With data incoming from the system, the TSAL 27 receives the address of the assigned time slot from the CPU 25 on the A lead and subrate period from the group control along with clock and timing information from the timing control 26. Data is received through the serial to parallel shift register U76, (FIG. 4A) over the Rx PCM lead and to the storage register tri-state 4×4 register files U72, U73, U75, in parallel at the time position dictated by TSAL 27. The data is monitored by the CPU 25 and sent to the UART's U82, U83 for forwarding to the specific terminal The data or control pair also transmit lamp data from the group control to operate the display lamps on the instrument, as shown by the Davis patent.

Data terminals may operate at any one of a number of baud rates. Thus, variable rates may be used and set.

This activity called subrate multiplexing may be described as follows:

Subrate multiplexing is the technique of sharing a single PCM time slot between two or more ports. The ability to dynamically share a single PCM time slot between as many data terminals as needed to make the combined data rate of these data terminals equal to the data rate of a single PCM time slot is termed as variable subrate multiplexing.

Subrate multiplexing is only needed if the voice switch is blocking and data from data terminal has to be switched along with voice. Data traffic has been shown to be quite different statistically from voice traffic in that it tends to be bursty with longer holding times. The later factor could seriously affect the voice traffic capability (CCS) in a blocking system since the statistical formulas used for calculating the voice traffic capability are no longer valid.

Since most data terminals communicate at much lower speeds than the 64 Kbps needed for voice communication, it would be poor utilization of the available baud width if a slow speed terminal, say 9600 bps was allocated the full 64 Kbps time slot. A better way would be to share a single time slot between several terminals thereby minimizing the impact on voice traffic. One way of doing this would be to decide upon the maximum number of subslots per PCM time slot and allocate these time slots on a fixed basis i.e. one sub slot per terminal or on a variable bases i.e. one or more subs slot per terminal depending on its speed. Of course, subrate does not come for free. The overhead of the additional hardware needed has to be done on per card basis which could turn out to be quite expensive both in terms of component cost and the extra board real estate. The variable subrate multiplexing used in the system can be implemented to allow packing of data from any number of data terminals on one 64 Kbit time slot provided in any combination until the cumulative rate reaches 64 K bits per sec. On this basis, the number of subslots theoretically possible per single PCM channel is limited by the available hardware.

For the present system, data switching variable subrate multiplexing is used with eight sub slots per single PCM slot since the system is nonblocking up to 192 ports. Thus, it will be possible to share one single PCM time slot between up to eight terminals if each of these terminals is operating at speeds of eight Kbit per second or less. Note that the eight Kbit data rate is true data rate and does not include the overhead of start, stop or parity bits. It is the responsibility of the data interfaces to strip these bits from the source stream before putting it on the PCM bus and to later reconstruct these bits after picking the data from the PCM bus and before delivering it to the receiving terminal. Thus in case of asynchronous terminal there is at least a 2 bit overhead (one start and one stop bit) or a maximum of 4 bit (one start, 2 stop and one parity bit) for every character hence 9600 baud asynchronous data corresponds to a true data rate of less than 8000 bits per second. Similarly 19.2K baud asynchronous data corresponds to 16K bits per second true data rate. Since there are no start and stop bits in synchronous transmission there can be a maximum one bit (parity) overhead per character transmission. Hence, it is not possible to share one PCM time slot between eight synchronous terminals all communicating at 9600 bits/sec.

In such situations only four 9600 bps synchronous terminals will be able to share a single PCM slot. Similarly, only two 19.2 Kbps synchronous terminals will be able to share a single PCM time slot. To summarize, up to eight, eight Kbps or less terminals; four, 16 Kbps terminals; two, 32 Kbps terminals; one, 64 Kbps terminals or any combination for a total of 64 Kbps will be able to share a single PCM time slot.

The subrate multiplexing is controlled from a time slot control memory in the data interface circuit 27. This memory called the TSAL memories control the serial channel assignment for both transmit and receive functions and also the subrate. These memories appear as a 256×8 RAM.

The contexts of each memory location contain codes to control the hardware Rx/Tx PCM bus interface. Each memory location or address corresponds to one channel in one subrate or repetitive interval. There are a maximum of eight subrate intervals and 24 channels in each subrate interval, i.e. 8×24=192 channel combinations. Each of the 192 possible assignments must be properly initialized.

The 8-bit memory address is organized as:

| A7 A6 A5 | A4 A3 A2 A1 A0 |
|---|---|
| Subrate interval number | Channel number |

With these sub-time slot intervals available, data terminals having different rates may be accommodated.

The subrate time synchronization logic is made up of a binary upcounter which will add to the count every time a frame synchronization pulse is received. This counter will be reset by a master synchronization pulse which is generated at the system controller. This pulse is generated every four or eight frames and is bussed to all the group controllers which in turn, after buffering it, pass it on over the line. A strap is provided to disable the subrate multiplexing so that data can be transmitted every time slot. The master synchronization pulse is called 'DFR' or Data Framing.

The subrate controller uses a memory approach in which the time slot assignment controller has N*24 addressable memory locations (where N equals the number of subrates desired). In this case N equals eight for a possible eight subrates for every 64 Kbit channel. The subrate memory address is formed from the three bits of the subrate counter as described while the five least significant bits are derived from the frame counter (see FIG. 4).

The time slot assignment memory 27 looks like a 256 byte RAM to the CPU. A 2K*8 RAM chip (U65) is used to implement this memory. The contents of the memory location are divided into receiver enable nibble and transmit enable nibble. The content of each nibble indicates the port which is to be enabled to receive or transmit on that channel.

The subrate assignment memory 27 has the capability of being addressed and read or written by the CPU at any time. Thus the CPU address and the counter address are multiplexed in such a fashion so as to avoid potential conflict.

The output of the time slot assignment logic are the control signals for transmit and receive channels.

It is possible to achieve a higher data rate (maximum 64 Kbps) by simply writing into multiple memory locations. Thus, if a 16 Kbps rate is desired the user will write into two locations of the RAM 27. For a 64 Kbps data rate the user will write into eight locations in the subrate memory.

In the system there are two sets of transmit (Tx) and receive (Rx) PCM Group Busses. Each Tx and Rx PCM Group bus has twenty-four slots associated with each bus, thus having a total of 48 Tx slots and 48 Rx slots per group. The PCM bus slots are assigned a numerical value from 0 to 23 for each individual bus.

The PCM bus slots are circular in that following PCM bus slot 23, PCM bus slot 0 will follow again. The time between each PCM bus slot is 125 micro sec/24. Thus, the cycle will repeat itself every 125 micro seconds. Each PCM bus slot can contain eight bits of information and this information is what is transported through the system.

There is one set of Tx and Rx PCM system busses with 192 slots associated with each bus. These PCM bus slots are also circular and they also repeat every 125 micro seconds. The system PCM bus is eight times faster than the PCM shelf bus (i.e., eight system slot times equals 1 shelf slot time). Due to the higher speech of the system PCM bus, information being transported through the system can be delayed when trying to synchronize the system PCM bus to the shelf PCM bus.

The group PCM bus is able to place data contained in a group slot onto a slot in the system PCM bus by the procedure known as mapping. This mapping is handled by a "MTSI" RAM 17 associated with the group controller and is under the control of the group controller software. This "MTSI" has two parts, one for the Tx PCM bus mapping and one for the Rx PCM bus mapping. The Tx PCM bus mapping RAM has 192 locations each one corresponding to a system PCM bus slot, while the Rx PCM bus mapping RAM has 24 locations, each one corresponding to a group PCM bus slot. In order to map a Tx slot the group PCM slot number is placed into the memory location corresponding to the system PCM slot number, but for mapping an Rx slot the system PCM slot number is placed in the memory location corresponding to the group PCM slot number. An example of this is shown below:

To map Tx group slot 21 to systems lot 4 the value 21 will be written to the Tx RAM at system location 4.

To map Rx group slot 21 to system slot 4 to the value 4 will be written to the Rx RAM at group location 21.

|    | Group Slots |    |    |    |    |    |    |    |    | System Slots |
|----|----|----|----|----|----|----|----|----|----|----|
|    |    |    |    |    |    |    |    |    |    | 00 |
|    | 00 | 01 | ... | 17 | 18 | 19 | 20 | 21 | 22 | 23 | 01 |
| Tx |    | ... |    |    |    |    |    |    |    |    |
|    |    |    |    |    |    |    |    | 21 |    |    | 04 |
| Rx |    | ... |    |    |    |    | 04 |    |    |    | 190 |
|    |    |    |    |    |    |    |    |    |    |    | 191 |

Due to difficulty in synchronizing between the higher speed system PCM bus and the lower speed group PCM bus, delays can result. There can be a maximum of one frame delay (125 micro seconds) between mapping a system slot to a group slot. Bus when mapping a full connection requiring the mapping to be done twice, there can exist up to two frame delays. The delay is a result of hardware, in that eight system slots are required to either extract or place information on a shelf slot. The eight system slots corresponding to the group slots are shown below:

| System Slots Numbers | Group Slots Number |
|----|----|
| 0->7 | 0 |
| 8->15 | 1 |
| 16->23 | 2 |
| : : | : |
| 184->191 | 23 |

Thus, in order to extract or place information on group slot 1, system slots 8 to 15 will be required.

Delays in transmission occur when group slot information is to be extracted and placed on a system slot. If the information to extract from the group slot is not entirely available by the time the mapped system slot arrives, a one frame delay will result. If for example, group slot 0 is mapped to system slot 7 or less, a one frame delay will result, since system slots 0 to 7 are required to fully extract the information from shelf slot 0. Thus, the group slot information will be placed on the system slot at the next occurrence. In general the following algorithm (formula) applies:

IF GROUP SLOT NUMBER >= (SYSTEM SLOT NUMBER/8) THEN ONE FRAME DELAY
IF (SYSTEM SLOT NUMBER/8) > GROUP SLOT NUMBER, THEN NO FRAME DELAY.

Delays in reception occur when system slot information is to be extracted and placed on a group slot. If the information to be extracted from the system slot is not entirely available by the time the mapped group slot is being updated by its corresponding eight system slots, a one frame delay will result. If, for example, group slot 1 (requires system slots 8 to 15 for updating) is mapped to system slot eight or greater, a one frame delay will result, since the information was not present prior to the first system slot required to update the group slot. In general, the following algorithm applies:

IF GROUP SLOT <= (SYSTEM SLOT NUMBER/8) THEN ONE FRAME DELAY
IF (SYSTEM SLOT NUMBER/8) < GROUP SLOT NUMBER, THEN NO FRAME DELAY.

There are three main factors: economy of time, space and usage of the least number of system channels, that should be taken in consideration when choosing an algorithm to implement the Channel Submultiplexing. The information needed to keep track of subrates are the following:

| (a) Group Channel | (range 0 to 23) |
|----|----|
| (b) Subrate Number | (range 0 to 7) |
| (c) System Channel | (range 0 to 192) |

There are at least three methods of implementing Channel Submultiplexing. The first and the simplest is the Table Storage Method. The second is called Queue method. This method allows the addition of one element in the list from one end and the deletion from the other end of the list. The third method is the Linked Allocation method of storage. In this method a pool or list of free nodes, called the availability list, is maintained in conjunction with linked allocation.

As a summary of the storage techniques sample comparative time and advantages are given in a table below:

| Method | Data Storage | Program Code | Total | Comment |
|---|---|---|---|---|
| Table L | 1200 Bytes | 600 Bytes | 1800 Bytes | Fast Search |
| Table | 1100 Bytes | 400 Bytes | 1500 Bytes | Slow Search |
| Queue | 1964 Bytes | None | 1964 Bytes | Slow Search |
| Link | 400 Bytes | 800 Bytes | 1200 Bytes | Fast Search |

By this comparison, the Linear Linked List is the method which provides the best combination and is therefore used to implement the Data Structure for the implementation of the Subrate Channel Multiplexing as described herein.

What is claimed is:

1. A digital PBX system comprising a plurality of groups, each comprising a plurality of ports, each group including a group controller controlling and providing access for said plurality of ports, said plurality of ports having access through the group controller to a system controller comprising a system bus including a plurality of time slots for handling calls through the system, the improvement wherein certain of said groups may include stations for voice and terminals for data, a data interface coupled to one or more data terminals over a pair of data conductors and a pair of control data conductors for receiving and transmitting digital data between respective data terminals and a group controller, said system controller responsive to a signal from a group control that a data terminal is seeking service through said system for assigning a time slot for data for the terminal seeking service within a recurrence period for that time slot, said system controller responsive to further data terminals seeking service for assigning other recurrence sub-slots within the same time slot having been assigned for the first mentioned data terminal seeking service.

2. A digital PBX system as claimed in claim 1, in which said data interface includes a memory for storing the address of the time slot and the recurrence sub-slot within the time slot, and in which said interface includes memory for temporarily storing data before transmission of said data to and from said system bus.

3. A digital PBX as claimed in claim 2, in which said interface further includes a microprocessor for monitoring the condition of the data control leads and the data leads from each data terminal coupled thereto for transmitting and receiving data from the terminal equipment over the PCM bus based on the subslot assignment.

4. A digital telecommunications system having a plurality of ports capable of accessing the system with said ports being connected in a plurality of groups and in which there is a system controller for controlling and allocating time slots on a digital bus for the transfer of digital data between ports of the system, the time slots on said bus periodically recurring in a plurality of recurrences in each recurring time frame, and in which there is a time slot interchanger for each group operated under the control of respective group controllers for each group, and in which there are ports of a first type transmitting and receiving signals at a first rate and in which there are ports of a second rate with the second rate being a fraction of the first rate; the invention in which there are port interfaces for ports of the first type and port interfaces for ports of the second type, a processor associated with each of the interfaces for ports of the second type for monitoring a plurality of the ports coupled thereto for signals at the second rate, each said interface processor responsive to signals transmitted from a port coupled thereto for notifying the system controller to allocate a time slot and a recurrence subrate and subrate address information for the transmission of signals from the port associated with the interface processor which notified the system controller.

5. A digital telecommunications system as claimed in claim 4, in which the ports of the first type comprise telephone instruments for speech transmission, and in which there are interface units coupled to ports of the first type for signaling said system controller to allocate a pair of time slots for transmitting and receiving speech signals to ports of the first type and in which the ports of the second type comprise data terminals, and in which the interfaces for ports of the second type include subrate time assignment storage and logic for assigning and storing time slot and subrate address data received from the system controller.

6. A digital telecommunications system as claimed in claim 5, in which the interfaces for ports of the second type including means for converting data signals to signals in pulse code modulation format for transmission through the system.

7. A digital telecommunications system as claimed in claim 4, in which there are eight subrate slots for each time slot recurring sequentially during a single time frame, with the time slots timed to receive standard pulse code modulation signals for receipt and transmission between ports of the first type.

8. A digital communication system as claimed in claim 4, in which ports of said first type have telephone instruments or trunk lines connected individually thereto and ports of the second type have data terminals individually coupled thereto.

* * * * *